(12) United States Patent
Chriss et al.

(10) Patent No.: US 10,339,174 B2
(45) Date of Patent: Jul. 2, 2019

(54) AUTOMATED LOCATION VISIT VERIFICATION FOR OFFICER MONITORING SYSTEMS

(71) Applicant: TimeKeeping Systems, Inc., Solon, OH (US)

(72) Inventors: Dean M. Chriss, Euclid, OH (US); Bryan Johnson, Barberton, OH (US)

(73) Assignee: Time Keeping Systems, Inc., Solon, OH (US)

( * ) Notice: Subject to any disclaimer, the term of this patent is extended or adjusted under 35 U.S.C. 154(b) by 124 days.

(21) Appl. No.: 14/998,869

(22) Filed: Feb. 24, 2016

(65) Prior Publication Data
US 2017/0243080 A1 Aug. 24, 2017

(51) Int. Cl.
| | |
|---|---|
| G06K 9/62 | (2006.01) |
| G06K 9/00 | (2006.01) |
| G06F 17/30 | (2006.01) |
| H04N 7/18 | (2006.01) |
| G06F 16/51 | (2019.01) |
| G06F 16/583 | (2019.01) |
| H04W 88/02 | (2009.01) |
| H04W 84/12 | (2009.01) |

(52) U.S. Cl.
CPC .......... *G06F 16/51* (2019.01); *G06F 16/5854* (2019.01); *G06K 9/00664* (2013.01); *H04N 7/185* (2013.01); *H04W 84/12* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 8,131,118 B1 | 3/2012 | Jing et al. | |
| 8,144,920 B2 | 3/2012 | Kansal et al. | |
| 9,137,308 B1* | 9/2015 | Petrou | H04L 67/12 |
| 2005/0246291 A1* | 11/2005 | Delgrosso | G06Q 20/3674 |
| | | | 705/67 |
| 2008/0226130 A1* | 9/2008 | Kansal | G01C 21/20 |
| | | | 382/106 |

(Continued)

*Primary Examiner* — Kate H Luo
(74) *Attorney, Agent, or Firm* — David A. Burge; Benjamin D. Burge (57) ABSTRACT

A method of using image comparison techniques to identify locations to be visited by an officer during a guard tour is disclosed. A reference image is created for each location to be visited by the officer during the guard tour. When the officer is at a location to be visited during a guard tour, the officer utilizes a portable wireless device, such as a smartphone, to display the reference image of the location and the live preview image of the location produced by the smartphone superimposed on one another. Image comparison software analyzes the live preview image being produced by the smartphone relative to the reference image. If the image comparison software determines that the live preview image of the guard tour location being produced by the smartphone and the reference image of the particular guard tour location identify the same location, a picture is automatically captured by the software and saved along with the date, time, and other information indicating that a visit was made by the guard tour officer to the particular location.

20 Claims, 6 Drawing Sheets

(56) References Cited

U.S. PATENT DOCUMENTS

| | | | | |
|---|---|---|---|---|
| 2010/0002071 A1* | 1/2010 | Ahiska | ............... | H04N 5/217 |
| | | | | 348/36 |
| 2010/0302409 A1* | 12/2010 | Matas | ............... | H04N 5/772 |
| | | | | 348/231.99 |
| 2015/0023602 A1* | 1/2015 | Wnuk | ............... | G06F 17/30247 |
| | | | | 382/190 |

* cited by examiner

AUTOMATED LOCATION VISIT VERIFICATION FOR OFFICER MONITORING SYSTEMS

TECHNICAL FIELD

The present invention relates, in general, to systems for monitoring the activities of officers during guard tours and, more particularly, to officer monitoring systems that utilize image comparison techniques to determine whether the officers have visited designated locations during a guard tour.

BACKGROUND ART

Typical officer monitoring systems employ one of many media types, such as barcodes, magnetic strips, RFID tags, and the like, to hold unique identifiers that are associated with the officers, the observations of the officers during a guard tour, and the locations that the officers visit during a guard tour. Officers carry a portable data collection device that they use to read the various identifiers from the media. An officer begins a guard tour by reading his or her identification with the portable data collection device, which stores the unique identifier associated with the officer along with a time stamp in memory. While on guard tour the officer uses the portable data collection device to timestamp and read data from media that are permanently mounted at predetermined locations that the officer is required to visit. The location identifier and associated timestamp are stored in the memory of the portable data collection device. If the officer makes a particular observation during the guard tour, the portable data collection device is used to timestamp and read media holding a unique identifier associated with each observation, or the observation is input into the portable data collection device via a keypad or touchscreen, depending on the particular system and data collection device being used. These observations relate to the security status of the site where the guard tour takes place, such as the status of a door lock, a broken window, and the like. The observations are typically associated with location the officer must visit while performing a guard tour. The unique observation identifier, or the input observation, and its timestamp are stored in the memory of the portable data collection device. The result is a set of data and timestamp pairs that define the officer's activity during a guard tour. The collected data is transferred to a computer as the data are collected, or at the end of the officer's shift, or at other times. Officer monitoring software executing on the computer performs analysis and reporting functions on the data.

The media that hold the unique identifiers associated with locations can be problematic when the media are mounted in areas that are subject to harsh conditions. For example, the fact that most media are visible and mounted on a wall may make them targets for vandalism, and media like barcodes and magnetic stripes are easily rendered inoperable. In addition, media such as barcodes are easily copied. RFID tags are more durable but more expensive, and can be pried from their mount or otherwise destroyed. To deal with these problems some officer monitoring systems use ruggedized media while some use a positioning system like GPS to verify that an officer has visited the required locations without the use of permanently mounted media. Each approach has inherent disadvantages. For instance, ruggedized media can be expensive and GPS does not work inside most structures.

In view of the foregoing disadvantages associated with present officer monitoring systems using the aforementioned methods, it has become desirable to develop an officer monitoring system that does not utilize such mounted media at the locations visited by an officer while on a guard tour.

SUMMARY OF THE INVENTION

The present invention solves the problems associated with the presently available officer monitoring systems and other problems by utilizing image comparison techniques to determine whether any given location to be visited by an officer during a guard tour, hereinafter referred to as guard tour locations, has been visited by an officer. Optionally, the same image comparison techniques can also be used to confirm the identity of the officer making guard tours. A reference image of a feature that uniquely identifies the specific guard tour location is created for each guard tour location. When the officer visits a guard tour location, a portable wireless device, such as a smartphone, carried by the officer displays a full screen version of the reference image for the selected location upon which is superimposed the location name, other relevant location data, and a "Compare Images" touch screen icon. When the icon is touched by the officer, the reference image of the guard tour location and the live preview image being produced by the camera are superimposed. The superimposition of these images assists the officer in adjusting the position of the portable wireless device to obtain a reasonable match to the reference image. Image comparison software analyzes the live preview image being produced by the camera relative to the reference image. Various algorithms for comparing images can be used for this purpose. If the image comparison software determines that the live preview image generated by the camera and the reference image of the particular guard tour location to be visited identify the same location within a predetermined period of time, a picture is automatically captured by the software and saved along with the date, time, and other information indicating that a visit was made by the officer to the particular guard tour location.

DESCRIPTION OF THE PREFERRED EMBODIMENT

For the purposes of the following discussion, the following definitions of some terms used herein are assumed:

capture an image: taking and storing a picture. The present invention utilizes digital pictures.

feature: a distinctive attribute or aspect. Visible features include the shapes and spatial relationships between visible forms or objects, and multiple visible objects. Non-visible features include magnetic and/or electric field density patterns and shapes and patterns and shapes that are seen only in the infrared spectrum.

guard tour: a patrol of predefined locations in random or sequential order to assess security or other status.

guard tour location: a particular place to be patrolled by an officer during a guard tour.

image: a likeness such as a photograph.

live preview: a feature that allows a digital camera's display screen to be used as a viewfinder. This provides a means of previewing, framing, exposure, and the like. The preview is generated by means of continuously projecting the image formed by the lens of the camera onto an image sensor. This, in turn, feeds the electronic screen with the live preview image.

officer: an individual who performs guard tours.

wireless device: a device such as a tablet computer, laptop computer, smartphone or other device that can operate and communicate without the need for connecting wires.

reference image: an image used as a standard for comparison.

visit: the act of going or coming to see a place, location, or person.

The present invention utilizes one or more portable wireless devices, such as smartphones, tablet computers, and the like, which are carried by officers who visit various guard tour locations while on a guard tour. These portable wireless devices, which incorporate cameras, monitors, touchscreens, keypads or other data input devices, along with an officer monitoring application of the present invention, serve as guard tour data collection and transmission devices. The portable wireless devices have cellular and/or Wi-Fi connectivity and are connectable to a server via various wireless communication networks, such as cellular, Wi-Fi, and other networks. The monitoring system of the present invention can also utilize portable data collection devices without wireless communication capabilities that incorporate a camera, monitor, data input devices and monitoring firmware and/or software of the present invention. These data collection devices store guard tour location visit data until it can be transferred to the server via a direct connection such as a docking station, and/or an intermediate computer, and a network, such as the Internet, a LAN, or other network. Alternatively, some directly connectable data collection devices may be connectable to a network, such as a LAN, or other network without the use of an intermediate computer, docking station or other intermediate device.

The server is equipped with software that incorporates a definition of rules, schedules, and other guard tour parameters that define expected performance of duties of the officer while on a guard tour. The officer monitoring software analyzes guard tour data that have been collected and transmitted by the portable data collection devices that are carried by the officers. The officer monitoring software executing on the server generates exception notifications, reports, and other data that are available to system users at remote computers. These remote computers are connected to the server via various communication networks like the Internet, LANs, Wi-Fi networks, cellular networks, land based telephone networks, and other communication networks. Additionally, these exception notifications, reports, and other data can be made available to users via smartphones connected to the server by the aforementioned networks.

The preferred embodiment of the present invention utilizes portable wireless devices, such as smartphones, and other portable wireless devices that incorporate a camera, viewing screen, and a provision for user input, including those without wireless communication capabilities that must be physically connected to a computer for the transfer of data.

Figure 1:
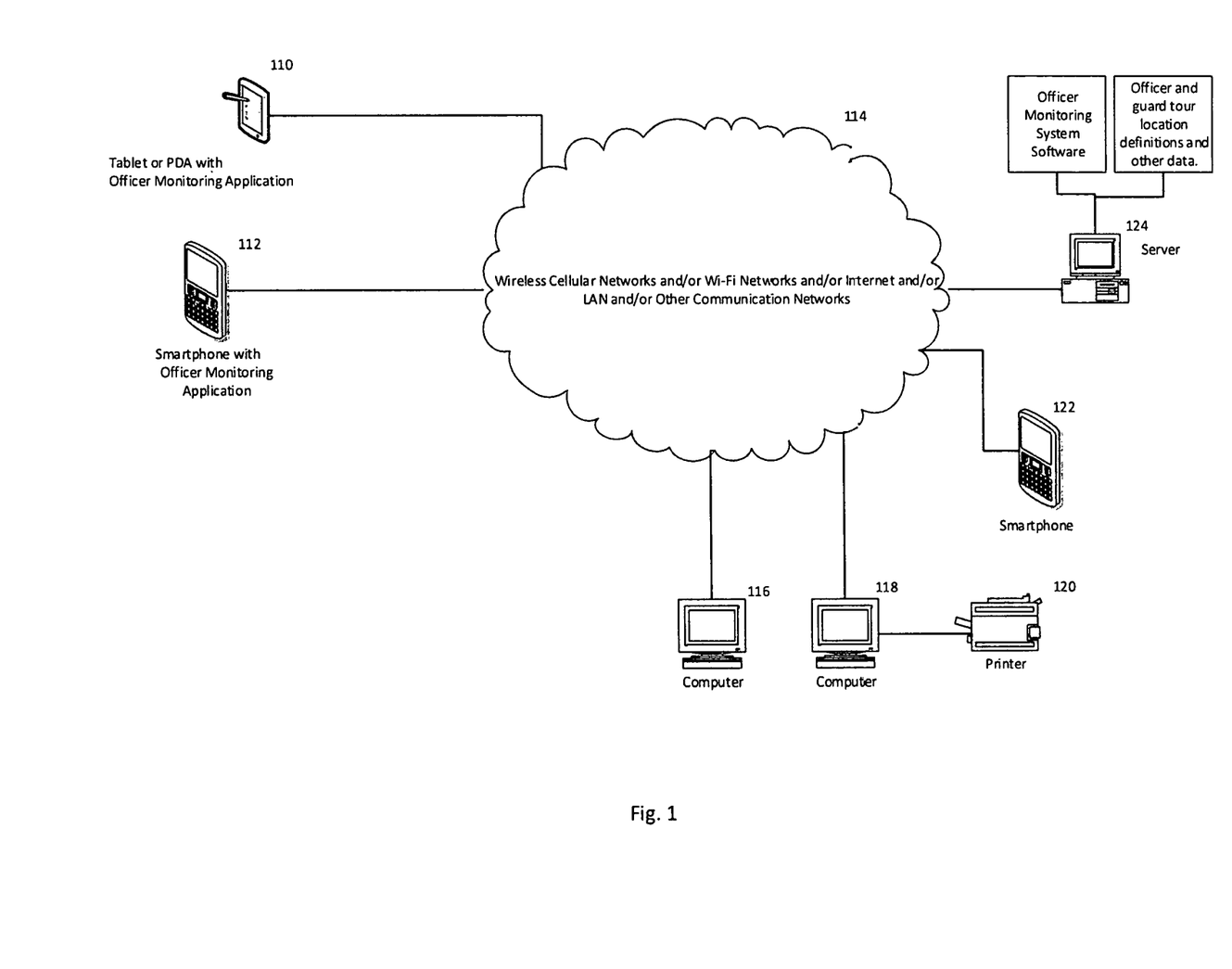
FIG. 1 is a schematic diagram of the overall system of the present invention.

Referring now to the Figures where the illustrations are for the purpose of describing the preferred embodiment of the present invention and are not intended to limit the invention disclosed herein, FIG. 1 is a schematic diagram of the overall system of the present invention. As such, the system utilizes a portable wireless device, such as a tablet or PDA 110 with an officer monitoring application and/or a smartphone 112 with an officer monitoring application. These portable wireless devices are connected by a communication network or networks 114 to a server 124 having officer system monitoring system software, officer definitions, guard tour location definitions, and other data therein. The server 124 is interconnected to computers 116, 118, a printer 120, and a smartphone 122 by communication network or networks 114 that can comprise Wi-Fi networks and/or the Internet and/or a LAN and/or other communication networks. Guard tour data that are gathered by the portable wireless devices 110 and 112 are communicated to the server 124 where the data are analyzed by officer monitoring system software relative to various guard tour parameters, such as officer definitions, guard tour location definitions, and other data that define the expected guard tours. The results of this analysis are made available to system users via computers 116, 118, printer 120, and smartphones 122.

Figure 2:
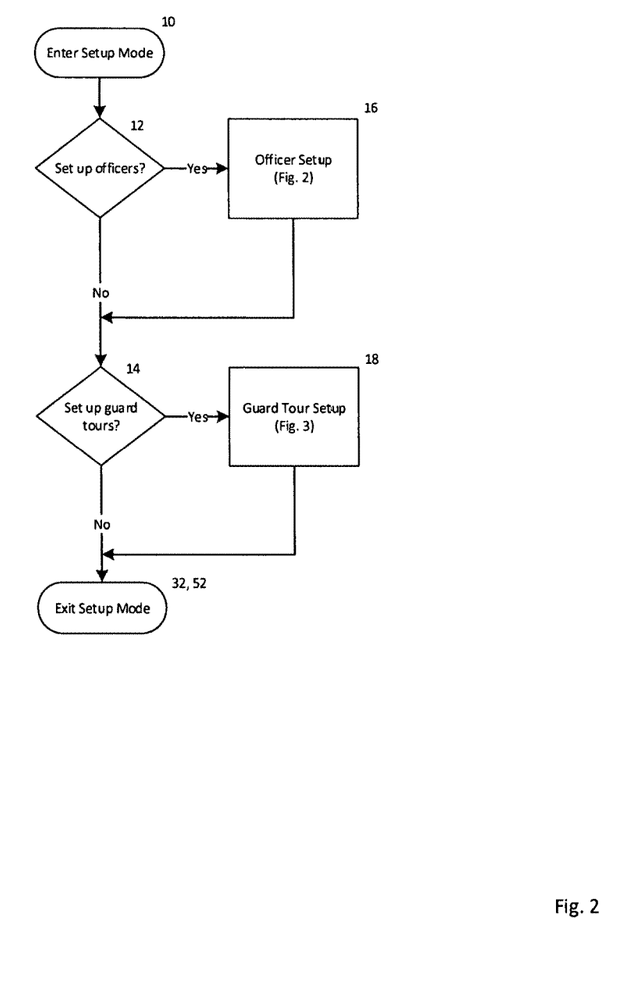
FIG. 2 is a flow chart of the logic utilized by the present invention for the officer monitoring system setup mode of operation.

Referring now to FIGS. 2-5, flow charts of the software that executes within the portable wireless device or alternatively on a remote computer 116,118 connected to the server 124 or on the server 124 are shown. To set up the officer monitoring system, a supervisor enters the setup mode, as shown in block 10 on FIG. 2, on the portable wireless device or alternatively on a remote computer 116, 118 connected to the server 124 or on the server 124. FIG. 2 is a flow chart of the logic utilized by the present invention for the officer monitoring system setup procedure. It should be noted that the same logic steps are required in all instances, but when setup is done on a remote computer 116, 118 connected to the server 124 or on the server 124, the required reference images (hereinafter discussed) for officers and guard tour locations must be created before or after the setup steps using the portable wireless device or a digital camera and then transferred to the server. Setup of the officer monitoring system using the portable wireless device is hereinafter described. After entering the setup mode shown in block 10, the supervisor is then able to choose in block 12 to create officer records for the officers who will perform guard tours or to choose in block 14 to create guard tour records, which are records containing data, including guard tour locations. If the supervisor chooses in block 12 to create officer records, the software enters the officer setup mode, shown as block 16 on FIGS. 2 and 3, the latter Figure being a flowchart of the logic utilized by the present invention to create officer records. The supervisor is then prompted to enter the name of the officer and other pertinent data relating to the officer, as shown in block 20 in FIG. 3. The supervisor is then prompted by the portable wireless device to decide whether barcodes or images, shown in block 22, will be used to identify the officer who will make the guard tour. If the supervisor selects barcodes, the portable wireless device prompts the supervisor to enter the unique officer identifier, shown in block 24, by using the camera of the portable wireless device to scan a barcode from an identification card that is issued to the officer. The portable wireless device then creates and stores the officer definition record, shown in block 26, and prompts the supervisor to input whether more officers are to be defined in block 28. If more officers are to be defined, the aforementioned procedure is repeated with the portable wireless device prompting the supervisor to enter the name and other data relating to the next officer. Otherwise, the portable wireless device uploads the officer definition records to the server 124 in block 30 and exits the officer setup mode in block 32.

Figure 3:
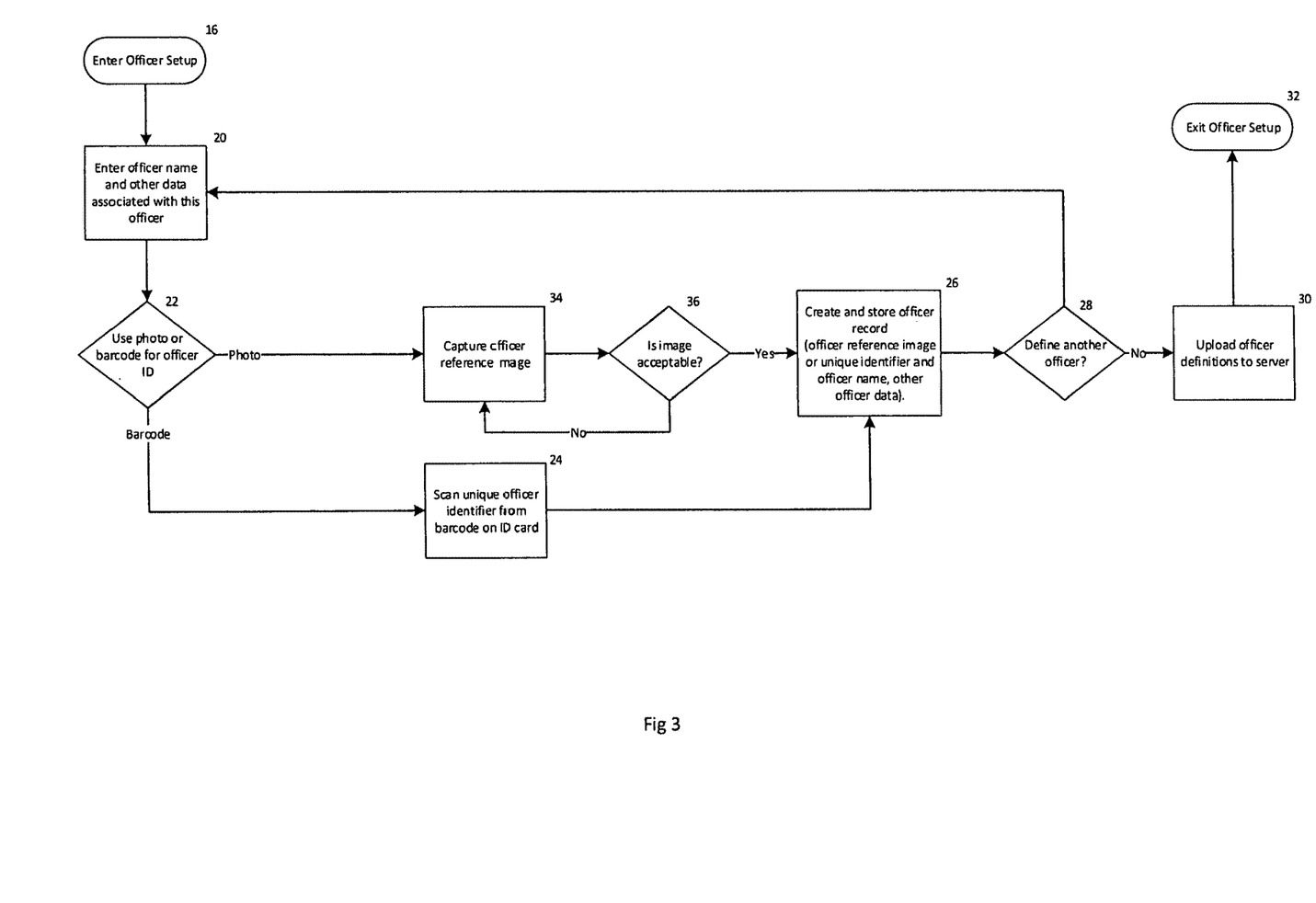
FIG. 3 is a flow chart of the logic utilized by the present invention for the officer setup mode of operation.
Figure 4:
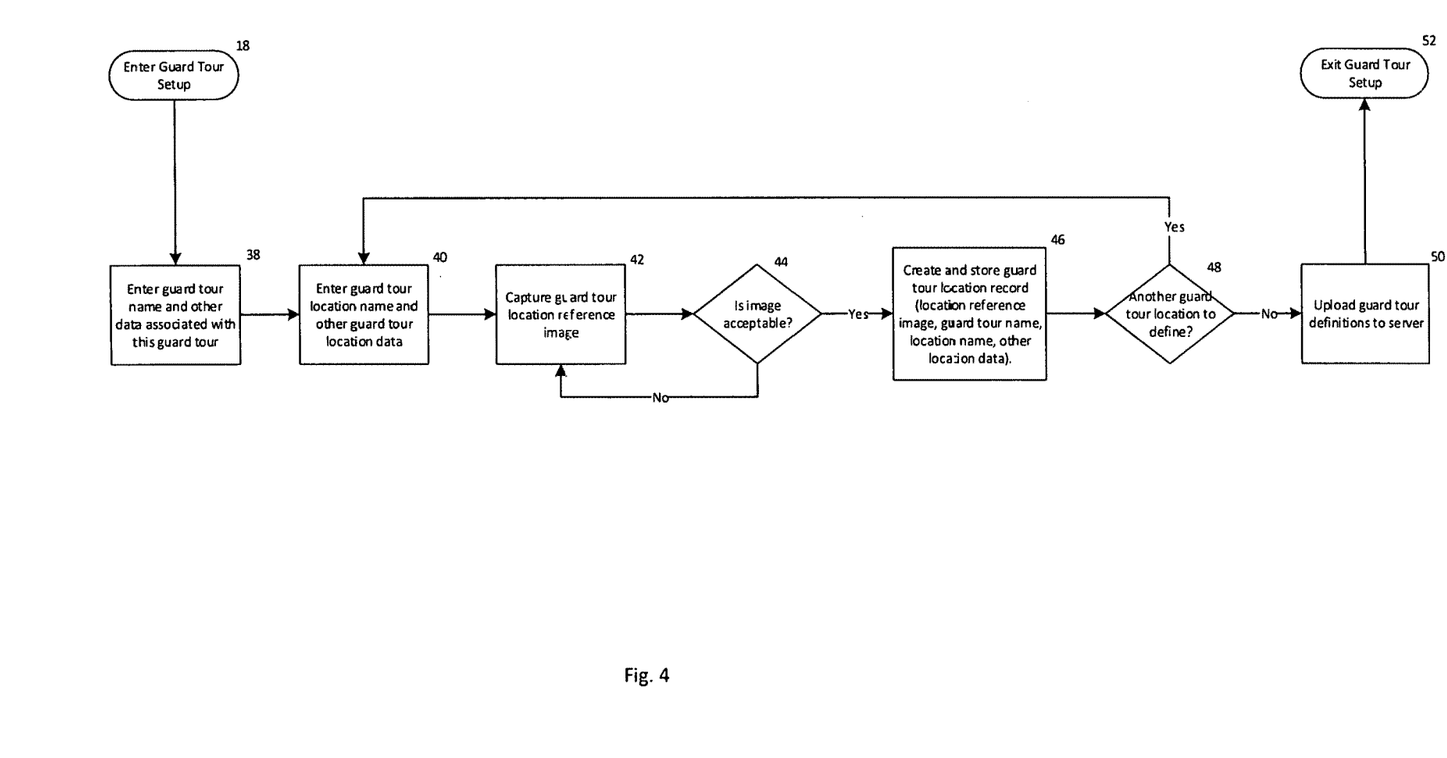
FIG. 4 is a flow chart of the logic utilized by the present invention for the guard tour setup mode of operation.

If the supervisor had previously decided that images, rather than barcodes, will be used to identify the officer in block 22, the portable wireless device then prompts the supervisor to capture a reference image of the officer's face in block 34. After the supervisor has captured the reference image of the face of the officer, the portable wireless device prompts the supervisor to decide whether the reference image is acceptable, i.e., the image is not blurred or shadowed, and shows the complete face of the officer, in block 36. If the supervisor decides that the image is not acceptable, the supervisor is again prompted to capture another image of the officer's face. This procedure is repeated until the captured image is acceptable. When the image is deemed to be acceptable, the portable wireless device creates and stores the officer definition record for the particular officer in block 26. The officer definition record includes the officer's reference image created by the supervisor in addition to the officer's name and other pertinent data relating to the officer. The portable wireless device then prompts the supervisor to input whether more officers are to be defined in block 28. If more officers are to be defined, the process repeats with the portable wireless device prompting the supervisor to enter the name and other data relating to the next officer. Otherwise, the portable wireless device uploads the officer definition records to the server 124 in block 30 and exits the officer setup mode in block 32. It should be noted that the previously described officer identification could alternatively be accomplished using fingerprints, iris or retina scans, hand geometry, and the like.

If desired, other means of officer identification can be used. These include officer login with a user name and password. In less secure situations, persons who are not defined within the monitoring system can make guard tours to guard tour locations that are defined within the system. In this case the officer setup mode is eliminated and anyone in possession of the correct smartphone, as identified by its telephone number, and incorporating the officer monitoring application can make and report guard tours.

If the supervisor had previously decided in block 12 to not set up officer definition records, or alternatively has finished setting up officer definition records in block 16, the supervisor is asked if guard tour records are to be set up in block 14. If the supervisor decides in block 14 to set up guard tour locations, the software enters the tour setup mode, shown as block 18 on FIGS. 2 and 4, the latter Figure being a flow chart of the logic utilized by the present invention to define guard tours to be performed by the officers. To set up the monitoring system for guard tours, a supervisor is prompted by the portable wireless device to enter a name for the guard tour along with other data pertaining to the guard tour, such as the address where the guard tour is to take place, contacts at the address, and the like, in block 38 in FIG. 4. The portable wireless device then prompts the supervisor to enter the name of a guard tour location the officer is to visit along with other data relating to the guard tour location in block 40. Optional descriptions such as "Ornate ventilation grate in northeast corner of lobby" can be included. The portable wireless device then prompts the supervisor to create a reference image, shown in block 42, of a feature or features that uniquely identify the first guard tour location to be visited by the officer using the camera of the portable wireless device. When the supervisor has completed the foregoing, the portable wireless device prompts the supervisor to decide whether the reference image is acceptable in block 44. An important criteria for the acceptability of an image is the uniqueness to the specific guard tour location of features and/or the spatial relationship between features contained in the image. For example, an image of a custom made cabinet, or an unusual arrangement of standard cabinets may be sufficiently unique to a particular location. An image of a common door that does not show a uniquely permanently mounted name plate or a unique spatial relationship with other permanent features may not be sufficiently unique. In addition, sharpness of the image and visibility of features shown within the image are important acceptability criteria. Images that are blurred or so dark that it is difficult to see identifying features within the image would be deemed unacceptable. If the supervisor decides that the reference image of the guard tour location is not acceptable in block 44, the supervisor is again prompted to capture a reference image of the guard tour location. This procedure is repeated until the reference image is deemed to be acceptable. When the reference image is deemed to be acceptable, the portable wireless device creates and stores a guard tour location record for the first guard tour location in block 46 and then inquires whether more guard tour locations are to be defined for the guard tour in block 48. If more guard tour locations are to be defined, the aforementioned procedure is repeated with the portable wireless device prompting the supervisor to enter the name and other data relating to another guard tour location in block 40. When the aforementioned procedure has been completed, the portable wireless device uploads the tour definition records to the server in block 50 and exits the tour setup mode in block 52.

Figure 5:
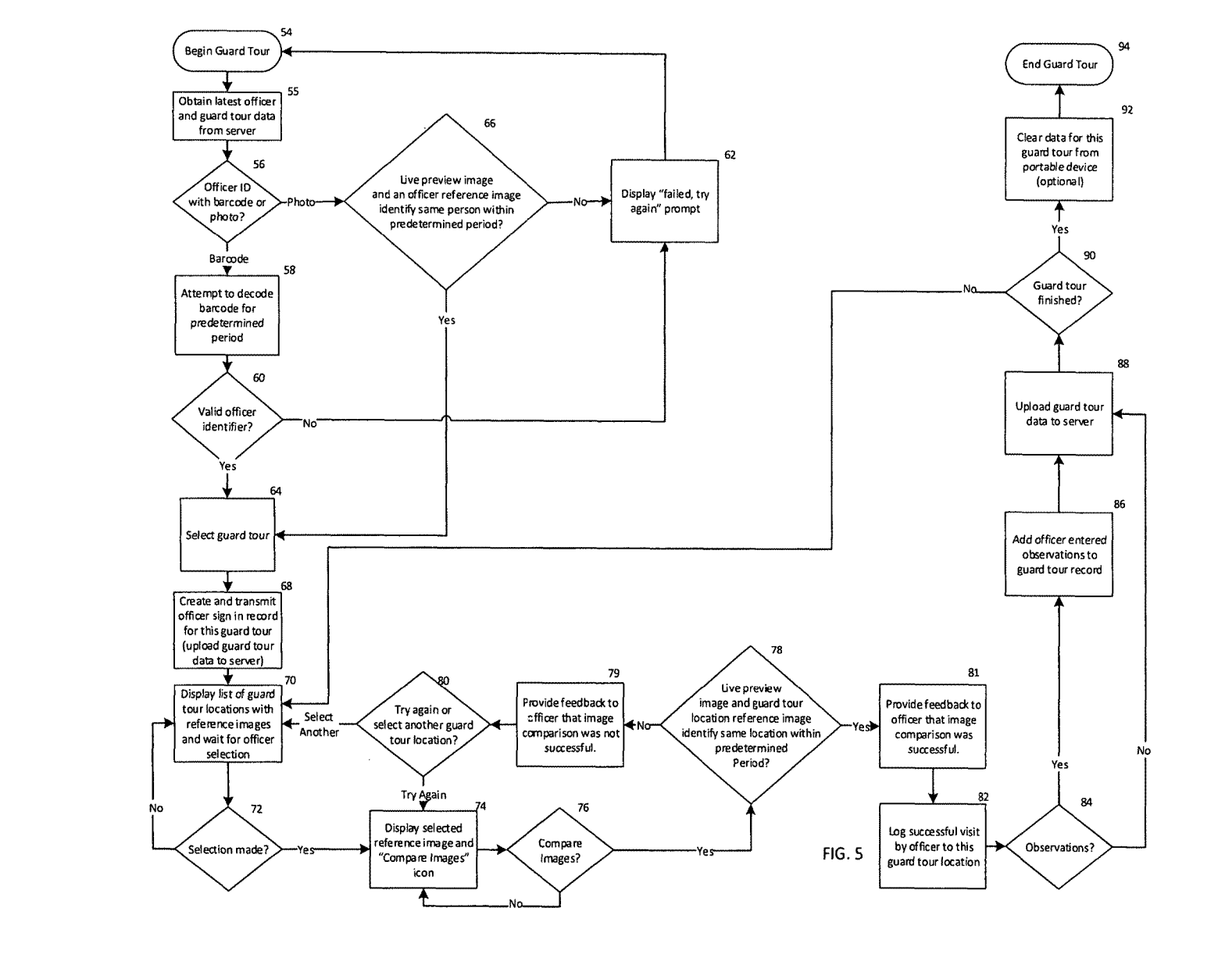
FIG. 5 is a flow chart of the logic utilized by the present invention when an officer visits guard tour locations in random order.

Referring now to FIG. 5, which is a flow chart of the logic utilized by the present invention for a guard tour when the officer visits guard tour locations in random order. In this instance when the officer makes his or her rounds, the officer first activates the "begin tour" function of the software, as shown in block 54. The portable wireless device then communicates with the server 124 to obtain the most recent officer and guard tour data, as shown in block 55. If the supervisor has previously decided that barcodes will be used to identify the officer, the officer must then direct the camera of the portable wireless device at a barcode containing a unique identifier associated with the officer, shown in block 56. The portable wireless device will attempt to decode any barcode within the camera's field of view for a predetermined period of time, as shown in block 58. If no barcode is found, or no valid officer identifier is decoded in block 60, the portable wireless device displays a "Failed, try barcode again" message in block 62 and the officer can start the process again. If a valid officer identifier is decoded within the predetermined period of time, the officer is prompted to select a guard tour from a list of possible guard tours in block 64.

If the supervisor has previously decided in block 22 in FIG. 3 that officer images would be used to identify the officer, the officer must then direct the camera of the portable wireless device at his or her own face, as described in block 56. The portable wireless device uses image comparison software to determine whether the live preview image generated by the camera and one of the previously described officer reference images identify the same person in block 66. If not, or if a determination cannot be made within a predetermined period of time, the portable device displays a "Failed, try photo again" message in block 62 and the officer can start the process again. If within a predetermined period of time the image comparison software determines that the live preview image generated by the camera and one of the officer reference images identify the same person, the officer's identity is confirmed and the officer is prompted to select a guard tour from a list of possible guard tours in block 64.

When the officer selects a guard tour from the list of possible guard tours, the portable wireless device creates an officer sign-in record in block 68 for this guard tour that includes the date, time, and officer's unique identifier and/or the officer image captured during the sign-in process. The portable wireless device then uploads its guard tour data to the server, updating the data that is stored on the server and available to system users with information relating to this officer sign-in.

Figure 6:
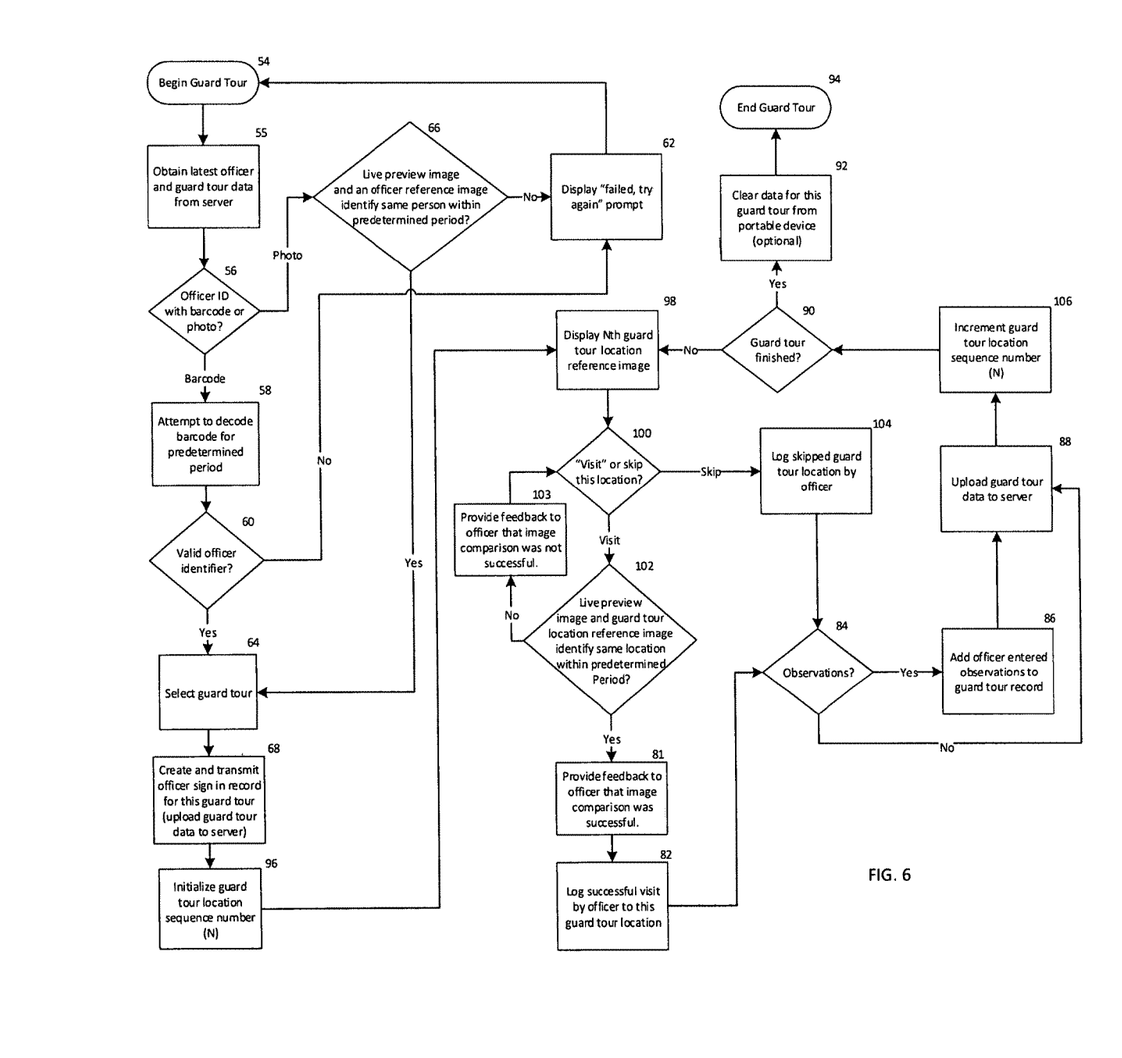
FIG. 6 is a flow chart of the logic utilized by the present invention when an officer visits guard tour locations in sequential order.

The portable wireless device next displays a list of guard tour location names to be visited by the officer on this guard tour, the reference image associated with each guard tour location, and other relevant data in block 70. The officer is prompted to select a guard tour location from this list to visit in block 72, allowing guard tour locations to be visited in a random order, as determined by the officer. Alternatively, the order of guard tour location visits can be predetermined by a supervisor, as shown in FIG. 6.

When the officer selects a guard tour location to visit from the list of guard tour locations to be visited, the portable wireless device displays a full screen version of the reference image for the selected guard tour location upon which is superimposed the guard tour location name, other relevant guard tour location data, and a "Take Photo" touch screen icon to be activated in block 74 when the officer is ready to capture an image of the guard tour location. The displayed image and information assist the officer in finding the correct guard tour location. When the "Compare Images" icon is touched by the officer in block 76, the camera of the portable wireless device is activated and the reference image of the guard tour location and the live preview image being produced by the camera are superimposed. The superimposition of these images assists the officer in adjusting the position of the portable wireless device to obtain a reasonable match to the reference image. The image comparison software utilized by the present invention analyzes the live preview image being produced by the camera relative to the reference image in block 78. Various algorithms for comparing images are known and can be used for this purpose. Algorithms that can compensate for differences in image size, camera orientation, and perspective are preferred because they make it unnecessary for the officer to exactly match the reference image of the guard tour location with the live preview image being produced by the camera. Algorithms that rely greatly on color matching tend to be less desirable because color temperature differences in lighting and differences in the automatic white balance settings between devices can affect accuracy.

If within a predetermined period of time the image comparison software determines that the live preview image generated by the camera and the guard tour location reference image do not identify the same location, the comparison procedure is stopped. An indication that the comparison procedure was not successful is provided to the officer in the form of a text message and/or a visual indicator, an audible indicator, vibration in the portable wireless device, etc., in block 79. The portable wireless device then provides the officer with the choice to try again in block 80 or, in the case of a random guard tour, select a different guard tour location. If the officer chooses the "select another location" option, the aforementioned procedure is repeated with the portable wireless device displaying the list of guard tour location names and reference images in block 70. Otherwise, the process is repeated with the portable wireless device displaying the previously selected reference image with the "Compare Images" icon in block 74.

If within a predetermined period of time the image comparison software determines that the live preview image generated by the camera and the particular guard tour location reference image identify the same location in block 78, information indicating that a visit to the particular guard tour location was made by the officer is saved by the software of the portable wireless device in block 82. This information can include an image that is automatically captured by the software of the portable wireless when it determined that the live preview image generated by the camera and the particular guard tour location reference image identify the same location. Additionally or alternatively, information such as a status bit indicating that a visit to the particular location was made by the officer, the current date, time, and other information may be included.

An indication that the comparison procedure was successful can be given to the officer in the form of a text message and/or a visual indicator, an audible indicator, vibration in the portable wireless device, etc., in block 81. After the guard tour location visit is confirmed by the image comparison software, the officer can enter observations in block 84. If the officer chooses to enter observations in block 84, such observations can be entered on the portable wireless device, along with optional photographs and/or video, with an associated time stamp.

After any observations are entered in block 86, or alternatively after the officer chooses not to enter such observations, the portable wireless device uploads its guard tour data to the server in block 88. This procedure updates the data that are stored on the server and available to users with information regarding the officer visit, including any observations that have been entered by the officer. If there are no more guard tour locations to be visited, the guard tour is finished in block 90. Because the data collected for this guard tour by the portable wireless device has already been uploaded to the server 124, the data can be cleared from the portable wireless device to free memory for future guard tours as shown in block 92 and the guard tour is ended in block 94. Otherwise, the previously described procedure is repeated commencing in block 70 with the portable wireless device displaying the list of guard tour location names and associated reference images for the officer to select. Guard tour locations that have already been visited are omitted from the list or shown as having been already visited.

The foregoing description applies to portable wireless devices such as smartphones that are capable of uploading data contained therein to a server or other remote computer as data are gathered by the portable wireless device. Alternatively, collected data can be stored in the portable wireless device and transferred at the end of a shift or at another convenient time. An appropriate device without wireless capabilities can also be used and the data that have been collected can be transferred to a computer and/or server at a convenient time by physically connecting the portable wireless device to the computer, or alternatively, to a network to which the computer and/or server is attached.

It is anticipated that various adaptations of the foregoing could be made, including a version in which guard tour locations are visited in a predefined order as shown in FIG. 6, which is a flow chart of the logic utilized by the present invention for guard tours that require officer visits to guard tour locations in a sequential order, rather than a random order. In this instance the logic steps shown in blocks 54-68 and blocks 82-94 in FIG. 5 are also utilized in FIG. 6 and will not be discussed further. Referring now to FIG. 6, after the portable wireless device creates an officer sign-in record in block 68 including the date, time, and officer's unique identifier and/or officer image captured during the sign-in process, the guard tour location sequence number (N) is initialized in block 96 and the Nth guard tour location reference image is displayed in block 98. For instance, N is initialized to 1 in block 96 for the first guard tour location in a sequential guard tour. The portable wireless device displays a full screen version of the reference image for the selected guard tour location upon which is superimposed the location name and other relevant data, along with "visit" and "skip" touch screen icons. The displayed image and information assist the officer in finding the correct guard tour location. If, in block 100, the officer decides to proceed with a "visit" to this location, touching of the "visit" screen icon of the portable wireless device by the officer causes the reference image of the guard tour location and the live preview image being produced by the camera to be superimposed. The image comparison software utilized by the present invention analyzes the live preview image being produced by the camera relative to the reference image in block 102. Here again, various algorithms, as previously discussed with respect to FIG. 5, are used for this purpose. If the image comparison software determines that the live preview image generated by the camera and the guard tour location reference image do not identify the same location within a predetermined period of time, the comparison procedure is stopped. An indication that the comparison procedure was not successful is provided to the officer in the form of a text message and/or by a visual indicator, an audible indicator, vibrations in the portable wireless device, etc., in block 103. The portable wireless device then provides the officer with the choice to try again in block 102, or to skip the guard tour location and log that the guard tour location was skipped in block 104. It should be noted that if in block 100 the officer initially decided not to proceed with a visit to a particular guard tour location, the officer could have chosen to skip the guard tour location and log that the guard tour location was skipped in block 104. If the image comparison software determines that the live preview image generated by the camera and the particular guard tour location reference image identify the same location within a predetermined period of time in block 102, information indicating that a visit to the particular guard tour location was made by the officer is saved by the software of the portable wireless device in block 82. This information can include an image that is automatically captured by the software of the portable wireless device when it determined that the live preview image produced by the camera and the particular guard tour location reference image identify the same location. Additionally or alternatively, information such as a status bit indicating that a visit to the particular location was made by the officer, the current date, time, and other information may be included. Here again, an indication that the comparison procedure was successful can be given to the officer in the form of a text message and/or a visual indicator, an audible indicator, vibration, in block 81. N is incremented in block 106 for each successive guard tour location as the tour progresses. When all of the sequential guard tour locations have been either visited or skipped as previously described, block 90 determines that the guard tour is finished. The data are then optionally cleared from the portable wireless device in block 92 and the guard tour is ended in block 94.

It is further anticipated that other adaptations of the foregoing could be made, including a version in which guard tour locations are visited in random order and according to various rules, i.e., visits twice per day, once per hour, and combinations thereof.

It is possible that an officer may attempt to falsify his or her visits to guard tour locations with printed photographs of one or more guard tour locations. Such falsification could be undertaken by using the portable wireless device to capture an image of a printed photograph of the guard tour location rather than capturing an image of the actual guard tour location. To some extent such falsification activity can be prevented by software utilizing GPS, which is typically incorporated into portable wireless devices like smartphones to verify that the officer actually visited the particular guard tour location. Alternatively, the opportunity for falsification can be eliminated by software utilizing the focal distance property in the Exchangeable Image File (EXIF) format data or other means of determining focal distance. Because a printed photograph is by necessity small in size, the camera of the portable wireless device must be close to the printed photograph for the image comparison software to determine that the live preview image generated by the camera and the guard tour location reference image identify the same location. In this case the focal distance is small, for example one foot. When capturing an image of an actual guard tour location such as a room, the focal distance is typically much larger, for example, twenty feet. Software of the present invention can therefore associate focal distance constraints with each reference image. These constraints can either be automatically generated when the reference image is made, or they can be entered by the supervisor at that time. When an officer captures an image of a location while on a guard tour the image comparison will fail if the focal distance of the given location image is not within the constraints previously assigned.

In an alternate embodiment, after creating a guard tour location reference image a supervisor can select a specific area or areas within the reference image that must be matched by the image comparison software. The remainder of the image can be ignored. Alternatively, the supervisor can select areas of the image to be ignored by the image comparison software and all other areas of the image must be matched. This approach permits the system to utilize images that contain unique permanent features, in addition to features that can be moved between officer visits. The areas selected by the supervisor can be highlighted to assist the officer in capturing the guard tour location image while on a guard tour.

The preferred embodiment of the present invention describes a guard tour visit confirmation system but the described system is useful for confirming the visits of anyone who is to visit a predetermined location. Many other embodiments are possible. Another alternate embodiment functions like the preferred embodiment but obtains reference images based upon a street address to be visited from a preexisting online image database. Such databases contain images that show the view from the street at any given street address, and are accessed by providing the street address. Addresses to be visited can be obtained automatically from systems that handle work orders, for instance. This embodiment is useful for confirming visits of home care personnel, appliance repair personnel, utility maintenance personnel, delivery services, and the like. A refinement of this embodiment automates the capture of the image to be compared with the reference image by using vehicle mounted cameras. These vehicle mounted cameras can be continuously monitored by software and compared to the reference image or they can be triggered by a global positioning system to capture images for comparison with a predetermined reference image only when they are located at or near the address to be visited. Such a system can relieve the person who is to visit a given address from the responsibility of capturing images or otherwise interacting with the system of the present invention.

Certain modifications and improvements will occur to those skilled in the art upon reading the foregoing. It is understood that all such modifications and improvements have been deleted herein for the sake of conciseness and readability, but are properly within the scope of the following claims.

We claim:

1. A method of confirming whether a predetermined location has been visited by an individual through the use of a wireless device comprising the steps of:
    a) obtaining, for storage by the wireless device, data pertaining to the predetermined location to be visited by the individual, including a name of the predetermined location and a reference image of at least one unique feature of the predetermined location;
    b) providing the individual with the name of the predetermined location to direct the individual to proceed to the predetermined location;
    c) displaying the reference image of the at least one unique feature on a display of the wireless device to enable operation of a camera of the wireless device to capture an image of the at least one unique feature when at the predetermined location;
    d) comparing the captured image of the at least one unique feature to the reference image of the at least one unique feature to determine whether the captured image identifies the at least one unique feature to thereby determine whether the captured image and the reference image identify the same location; and
    e) creating a record that the individual has visited the predetermined location in response to a determination that the captured image and the reference image identify the same location.

2. The method as defined in claim 1 wherein the reference image is obtained by earlier capturing an image of the at least one unique feature at the predetermined location as the reference image.

3. The method as defined in claim 2 wherein the captured image comprises a live preview image presented on the display of the wireless device to show what is within the field of view of the camera at the time the camera is operated to capture the captured image.

4. The method as defined in claim 3 further including within step c), the step of superimposing the live preview image and the reference image on the display of the wireless device.

5. The method as defined in claim 1 wherein the at least one unique feature comprises a visible feature of the predetermined location.

6. The method as defined in claim 1 wherein steps c) through e) may be repeated until the determination that an image captured by the camera and the reference image identify the same location is made.

7. The method as defined in claim 1 further including, after step e), the step of recording whether the captured image identifies the at least one unique feature.

8. The method as defined in claim 7 wherein:
    the captured image comprises a live preview image presented on the display of the wireless device to show what is within the field of view of the camera at the time the camera is operated to capture the captured image; and
    the camera is automatically operated to capture the captured image in response to a determination that the live preview image identifies the at least one unique feature.

9. The method as defined in claim 1 further including, after step c), the step of verifying that the captured image is distinguishable from a photograph of the at least one unique feature held within the field of view of the camera by utilizing subject distance.

10. The method as defined in claim 1 wherein the reference image is obtained from a preexisting database of a plurality of reference images.

11. The method as defined in claim 1 wherein the wireless device comprises a smartphone.

12. The method as defined in claim 1 wherein the predetermined location is one of a plurality of predetermined locations to be visited by the individual.

13. The method as defined in claim 12 wherein the plurality of predetermined locations are to be visited in a predetermined order by the individual.

14. The method as defined in claim 12 wherein the plurality of predetermined locations are to be visited in a random order by the individual.

15. A wireless device comprising:
    a camera;
    a display; and
    a processor communicatively coupled to the camera and the display, and configured to:
    a) obtain data pertaining to the predetermined location to be visited by the individual, including a name of the predetermined location and a reference image of at least one unique feature of the predetermined location;
    b) operate the display to present the individual with the name of the predetermined location to direct the individual to proceed to the predetermined location;
    c) operate the display to present the reference image of the at least one unique feature on a display of the wireless device to enable operation of a camera of the wireless device to capture an image of the at least one unique feature when at the predetermined location;
    d) compare the captured image of the at least one unique feature to the reference image of the at least one unique feature to determine whether the captured image identifies the at least one unique feature to thereby determine whether the captured image and the reference image identify the same location; and
    e) create a record that the individual has visited the predetermined location in response to a determination that the captured image and the reference image identify the same location.

16. The wireless device of claim 15, wherein the processor is further configured to operate the display to present a live preview image that shows what is within the field of view of the camera at least until the camera is operated to capture the captured image.

17. The wireless device of claim 16, wherein the processor is further configured to superimpose the live preview image and the reference image on the display.

18. The wireless device of claim 16, wherein the processor is further configured to automatically Operate the camera to capture the captured image in response to a determination that the live preview image identifies the at least one unique feature.

19. The wireless device of claim 15, wherein the processor is further configured to verify that the captured image is distinguishable from a photograph of the at least one unique feature held within the field of view of the camera by utilizing subject distance.

20. The wireless device of claim 15, wherein the wireless device comprises a smartphone.

\* \* \* \* \*